United States Patent [19]

Tuccio

[11] 4,193,855

[45] Mar. 18, 1980

[54] ISOTOPE SEPARATION BY MULTIPHOTON DISSOCIATION OF METHYLAMINE WITH AN INFRARED LASER

[75] Inventor: Sam A. Tuccio, Randolph, N.J.

[73] Assignee: Allied Chemical Corporation, Morris Township, Morris County, N.J.

[21] Appl. No.: 892,228

[22] Filed: Mar. 31, 1978

[51] Int. Cl.$^2$ .......................... B01D 54/00; B01J 1/10
[52] U.S. Cl. ........................ 204/158 R; 204/DIG. 11
[58] Field of Search ................... 204/158 R, DIG. 11; 250/423 P

[56] References Cited

U.S. PATENT DOCUMENTS

| | | | |
|---|---|---|---|
| 3,405,045 | 10/1968 | Hoskins | 204/DIG. 11 |
| 3,719,454 | 3/1973 | Shang | 204/158 R X |
| 3,941,670 | 3/1976 | Pratt | 204/158 R |
| 3,947,335 | 3/1976 | Marling | 204/158 R |
| 3,983,020 | 9/1976 | Moore et al. | 204/158 R |
| 4,029,558 | 6/1977 | Marling | 204/158 R |
| 4,029,559 | 6/1977 | Marling | 204/158 R |
| 4,064,025 | 12/1977 | Chen | 204/158 R |
| 4,105,921 | 8/1978 | Bartlett et al. | 250/423 P |
| 4,120,767 | 10/1978 | Bittenson et al. | 204/158 R |

FOREIGN PATENT DOCUMENTS 690681 7/1974 Canada .

2557206 3/1977 Fed. Rep. of Germany ....... 250/423 P

OTHER PUBLICATIONS

Moore, C. B., "The Application of Lasers to Isotope Separation," Acct. of Chem. Res. 6:323–328, 1973.
Ambartzumian, R. V. et al., "Selective Two–Step (STS) Photoionization of Atoms and Photodissociation of Molecules by Laser Radiation," App. Opt. 11(2): 354–358, 1972.
Marling, J. B., "Laser Isotope Separation of Deuterium," Chem. Phys. Lett. 34 (1): 84–89, 1975.
Lin, C. T., "Laser Stark Spectroscopy and Isotopic Separation," Spectro. Lett. 9(9): 615–631, 1976.

Primary Examiner—Richard E. Schafer
Attorney, Agent, or Firm—Ernest D. Buff; Gerhard H. Fuchs

[57] ABSTRACT

Methylamine ($CH_3NH_2$) is dissociated into $CH_3\cdot$ and $NH_2\cdot$ radicals when irradiated with the output from an infrared laser. Ammonia ($NH_3$) is then formed inherently through radical and molecular collisions. By tuning the laser to the appropriate frequency, the dissociation process is isotopically selective. As a consequence, ammonia, or other nitrogen containing compounds, are obtained which are selectively enriched in $^{14}N$ or $^{15}N$. Carbon isotopes may be separated with essentially the same technique.

6 Claims, 4 Drawing Figures

ISOTOPE SEPARATION BY MULTIPHOTON DISSOCIATION OF METHYLAMINE WITH AN INFRARED LASER

BACKGROUND OF THE INVENTION

1. Field of the Invention

The present invention relates to enrichment and separation of isotopes, in particular $^{14}N$ and $^{15}N$, and $^{12}C$ and $^{13}C$ by multiphoton dissociation of methylamine.

2. Description of the Prior Art

The projected use of $^{15}N$ in the nuclear industry is expected to reach 500,000 kg/year. Major use is in fuel pellets and cladding in uranium and plutonium nuclear reactors. Also, $^{15}N$ and $^{13}C$ are presently used as tracers in the fields of medicine and research. Low cost schemes for separating these isotopes are accordingly required.

Ambartsumyan et al. in Vol. 17, *Journal of Experimental and Theoretical Physics Letters*, pp. 63–65 (1973) disclose isotope separation of $^{14}N$ and $^{15}N$ by a two-step photodissociation of $^{14}NH_3$ and $^{15}NH_3$, in which monochromatic radiation of a frequency $\nu_1$ selectively excites a vibrational transition of molecules of only one isotopic composition. The molecules are simultaneously illuminated with light of frequency $\nu_2$, the quantum energy of which is sufficient for photodissociation of only the vibrationally excited molecules. However, this is a costly process and provides a possibility of isotopic scrambling due to four different intermediate chemical reactions.

Robinson et al. in U.S. Pat. No. 4,049,515, issued Sept. 20, 1977, disclose laser isotope separation schemes by multiple photon absorption. Briefly, the schemes involve irradiating a molecular species having at least two isotopes of an element with infrared laser light of a frequency which selectively excites to a vibrational level only those molecules of the molecular species containing a particular isotope. Use of multiple photon absorption produces a sufficiently energetic vibrational state such that the molecules containing the particular isotope undergo a chemical reaction, such as dissociation or reaction with a second molecular species. The patent discloses two examples for which laser induced enrichment was obtained; namely the enrichment of $^{34}S$ in natural $SF_6$ and $^{11}B$ in natural $BCl_3$. However, there is no teaching therein of a method for selecting a candidate molecular species from the essentially infinite number of species which exist for any given element for which the process of Robinson et al. is applicable. When a molecule is subjected to infrared radiation in the manner taught by Robinson et al., the isotopic shift is generally masked by other vibrational modes or, if unmasked, has a magnitude lower than that required for isotope separation. In addition, it has not been possible to precisely predict the manner in which a molecule will dissociate or react with other species when subjected to high intensity infrared radiation. Hence, no general method can be given for devising a laser-chemical reaction system which will effect removal of the desired isotopic species. As a result, it has heretofore not been possible to predict which molecules lend themselves to laser isotope separation by multiple photon absorption.

Although present usage of $^{15}N$ is small, projected use in core elements of liquid-metal fast breeder reactors is considerable, as mentioned above. Current separation of $^{15}N$ is accomplished by NO distillation, or by chemical exchange between NO and $HNO_3$. The latter process has an enrichment factor of about 1.055. The only proposed separation of nitrogen isotopes with a laser discussed above (Ambartsumyan et al.) suggests an isotopic enrichment factor of about 4. However, the considerable potential for isotopic scrambling renders the proposed process unsuitable on a commercial scale.

Carbon isotopes are presently separated by low temperature distillation of carbon monoxide and by gas phase thermal diffusion of methane. The carbon monoxide process for separating $^{13}C$ is based on a vapor pressure differential that yields an enrichment factor of about 1.011.

SUMMARY OF THE INVENTION

The present invention provides a process for obtaining nitrogen containing compounds which are enriched in a particular isotope of nitrogen. The process comprises exposing gaseous methylamine containing two or more isotopes of nitrogen to substantially monochromatic infrared laser radiation. The frequency of the infrared radiation is coincident with a vibration absorption band of the methylamine, producing dissociation of the methylamine into $CH_3\cdot$ and $NH_2\cdot$ radicals. Through molecular and radical collisions, the $NH_2\cdot$ radicals abstract a hydrogen atom, forming ammonia. The addition of other gaseous materials, such as oxygen, can be added to the methylamine to scavenge the $NH_2\cdot$ radicals to form other nitrogen containing compounds. The process is accomplished isotopically selectively by employing a vibrational band which exhibits an isotope shift. Specifically, $^{15}NH_3$ was obtained with an enrichment factor of 1.65.

The process provided herein may be directly applied to the enrichment of carbon isotopes by slightly modifying the wavelength of the laser radiation employed.

BRIEF DESCRIPTION OF THE DRAWINGS

The invention will be more fully understood and further details will become apparent when reference is made to the following detailed description of the preferred embodiments and the accompanying drawings, in which.

DESCRIPTION OF THE PREFERRED EMBODIMENTS

Figure 1:
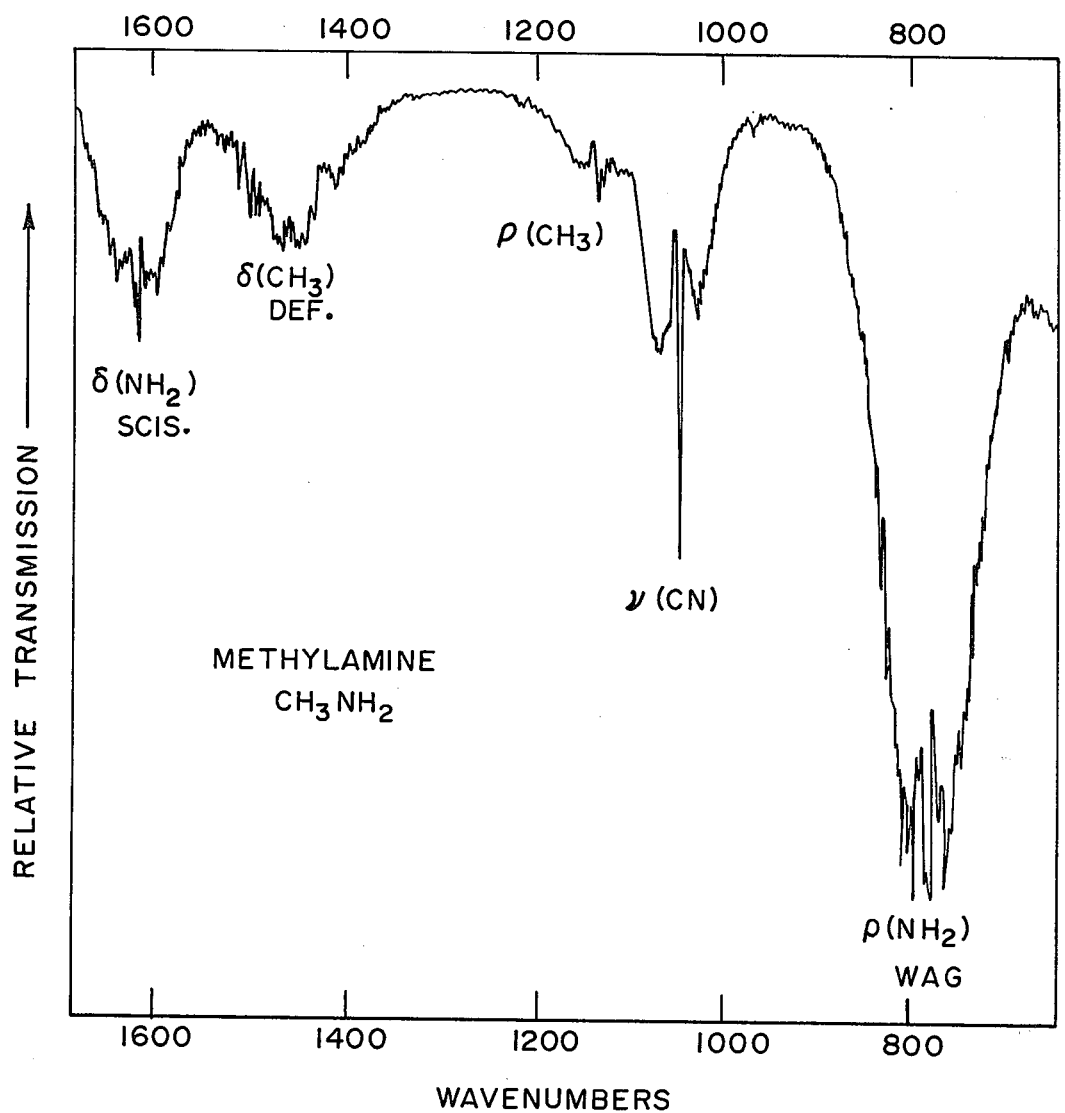
FIG. 1 is a graph showing an absorption spectrum of methylamine in a particular frequency region.

In accordance with the invention, a radiation frequency is selected which coincides with either the CN stretch vibrational mode, the $NH_2$ scissors vibrational mode, or the $NH_2$ wag vibrational mode in methylamine. These modes are depicted in FIG. 1, which is an absorption spectrum of methylamine in the region of interest. The spectrum shown in FIG. 1 was taken with natural methylamine, which contains 99.63% $CH_3{}^{14}NH_2$ molecules and 0.37% $CH_3{}^{15}NH_2$. Hence, the spectrum of FIG. 1 is basically that of the $^{14}N$ containing molecules.

Figure 2:
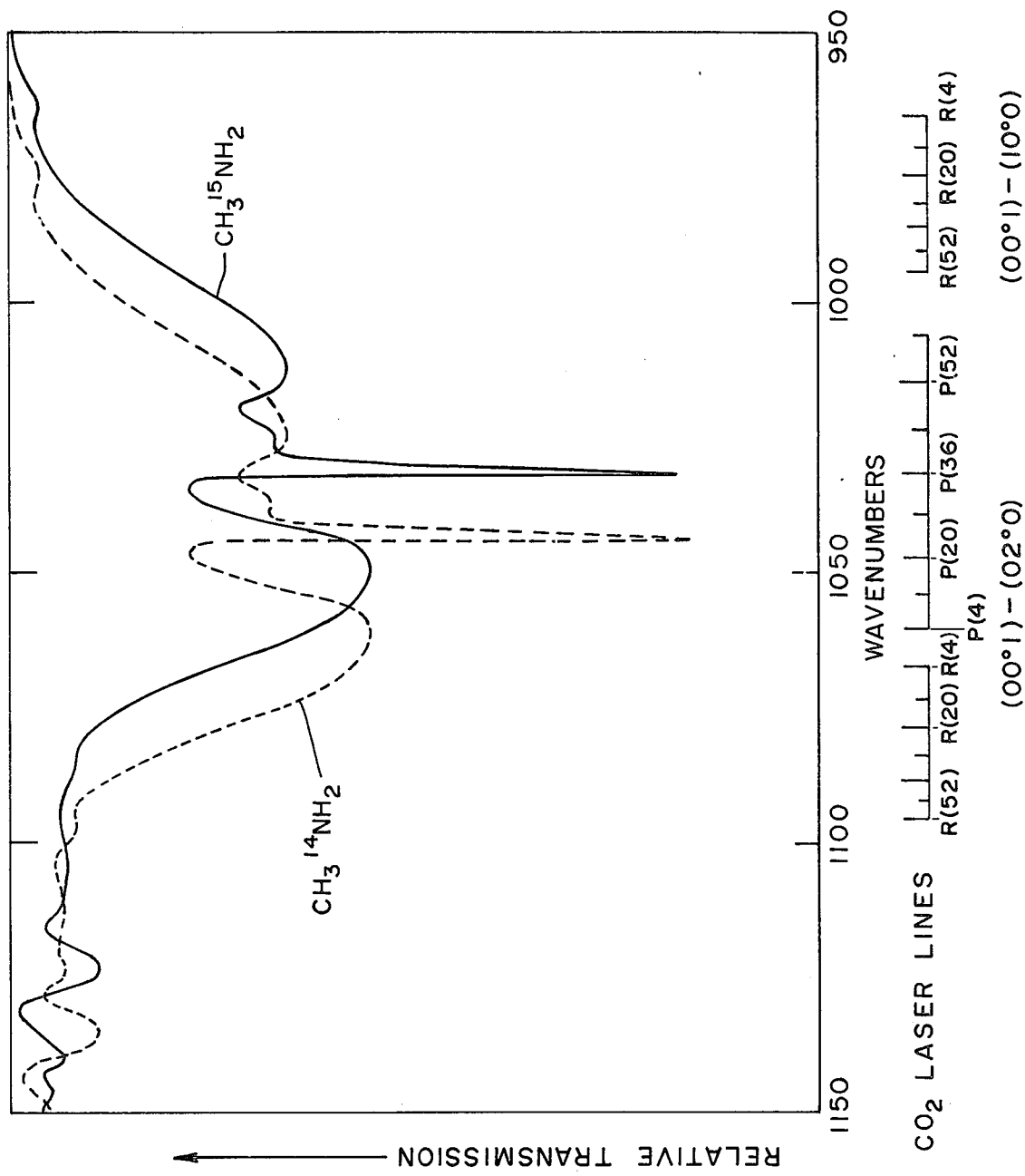
FIG. 2 is a graph showing, on an expanded scale, the CN vibrational mode.

The spectrum of the $^{15}N$ containing molecules is almost identical in shape and amplitude to that shown in FIG. 1, but is shifted to lower frequencies (wavenumbers). Such shift is not constant, but varies with vibrational mode. For the CN stretch mode, centered at 1044 cm$^{-1}$, the shift for $^{15}$N containing molecules is 13 cm$^{-1}$. This is illustrated in FIG. 2, which shows the CN vibrational mode on an expanded scale. Spectra shown in FIG. 2 have been smoothed to remove fine rotational structure in order to clarify the isotopic shift.

The isotopic shift for the NH$_2$ scissors mode, centered at 1623 cm$^{-1}$, is 6 cm$^{-1}$. For the NH$_2$ wag mode, the isotopic shift is 4 cm$^{-1}$. These isotopic shifts are a consequence of the difference in reduced masses between the two species. In addition to this consideration, the C—N bonding energy, which is approximately 87 kcal. mole$^{-1}$, is sufficiently low that absorption of multiple photons from an infrared laser can dissociate the molecules. Moreover, since the vibrational isotope shifts are sufficiently large, selective excitation and, consequently, selective dissociation are achieved.

The radiation employed is substantially monochromatic, having a band width less than the isotopic shift. For example, a tuned CO$_2$ laser is conveniently applicable for the CN stretch mode. As shown in FIG. 2, the (00°1)–(10°0) band (R branch) lines from a CO$_2$ laser can be used to preferentially excite CH$_3$$^{15}$NH$_2$ molecules. Similarly, CH$_3$$^{14}$NH$_2$ molecules are preferentially excited by (00°1)–(02°0) band (R branch) lines of a CO$_2$ laser.

Multiphoton dissociation of methylamine by a CO$_2$ laser yields ammonia as a major product. Secondary products of methane, ethylene and ethane are also observed. The initial dissociation reaction is predominantly

$$CH_3NH_2 \longrightarrow CH_3 \cdot + NH_2 \cdot \quad (1)$$

The most likely reactions for the ammonia formation are

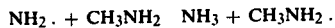

$$NH_2 \cdot + CH_3NH_2 \longrightarrow NH_3 + \cdot CH_3NH_2 \cdot \quad (2)$$

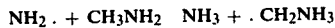

$$NH_2 \cdot + CH_3NH_2 \longrightarrow NH_3 + \cdot CH_2NH_3 \quad (3)$$

Hydrazine may also be formed through the collision of two NH$_2$· radicals. Under such circumstances, isotopically enriched hydrazine would also be produced by the process.

Other gaseous compounds can be added to the methylamine to scavenge the NH$_2$· radicals. The restrictions on these additive compounds are (1) such compounds should not chemically react with the methylamine, (2) the compounds should not absorb any of the laser radiation, (3) the product formed with the scavenged NH$_2$· radicals should not absorb the laser radiation, (4) the compounds should not induce scrambling of the isotopic purity through side reactions. A possible NH$_2$· scavenger could be oxygen with the formation of enriched nitric oxide, hydrogen cyanide and molecular nitrogen. Possible reactions for such a system are

$$NH_2 \cdot + O_2 \longrightarrow NO + H_2O \quad (4)$$

$$NH_2 \cdot + NO \longrightarrow N_2 + H_2O \quad (5)$$

$$CH_3 \cdot + NO \longrightarrow HCN + H_2O \quad (6)$$

Nitric oxide could be added directly to the methylamine to yield molecular nitrogen through reaction (5). However, this process would limit the isotopic purity to about 50%, unless the NO were isotopically pure to begin with.

The pressure of the methylamine is an important parameter. For example, at pressures greater than 1.0 torr, the ammonia isotopic purity decreases monotonically. The exact mechanism for this isotopic scrambling is not known.

The enrichment factor is defined herein as the $^{15}$N/$^{14}$N ratio in the product (for example, ammonia) divided by the $^{15}$N/$^{14}$N ratio in the reactant (for example, methylamine). By exciting the CN stretch mode with the R(14), 971.9 cm$^{-1}$ emission line from a pulsed CO$_2$ laser, and at a methylamine pressure of 1.0 torr, a of 1.65 is achieved. Maximum nitrogen enrichment using methods previously known is about 1.05. Improving the enrichment factor from 1.05 to 1.65 reduces from about 210 to 20 the number of theoretical plates or elementary stages heretofore required to achieve a 99% concentration of $^{15}$N. As a result, the markedly improved enrichment factor provided by the present invention substantially reduces the cost of the process over that required by conventional enrichment schemes.

Apparatus suitable in the practice of the invention comprises (a) a source of monochromatic infrared radiation, such as a CO$_2$ laser, (b) optics for adjusting the radiation beam size and divergence properties, (c) a cell into which the gaseous methylamine and gaseous radical scavengers may be introduced and from which the irradiated materials and gaseous products thereby formed may be removed, a portion of the cell being substantially transparent to the beam, and (d) means for reflecting the beam several times within the cell. Suitable examples of apparatus are depicted in FIGS. 3 and 4.

Figure 3:
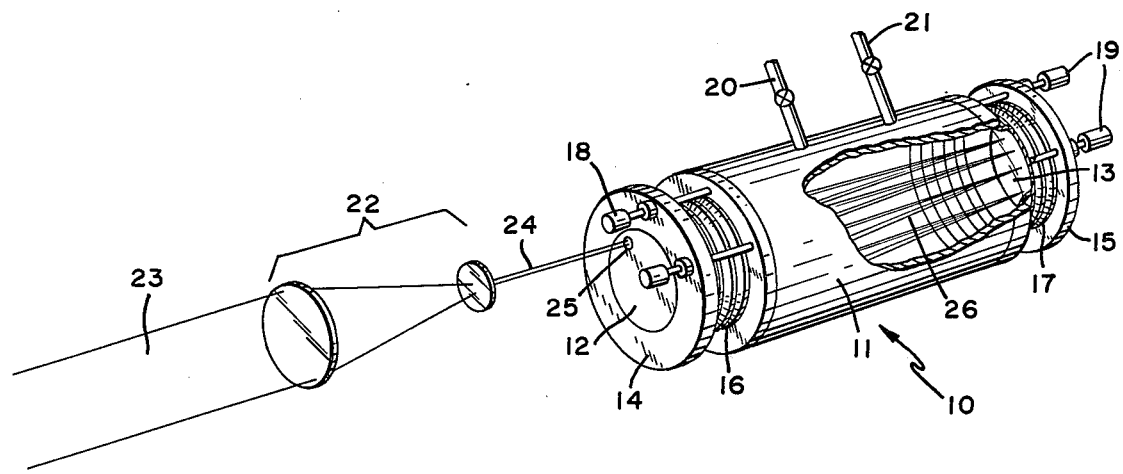
FIG. 3 is a perspective view, partially cut away, depicting one form of apparatus used in the present invention.
Figure 4:
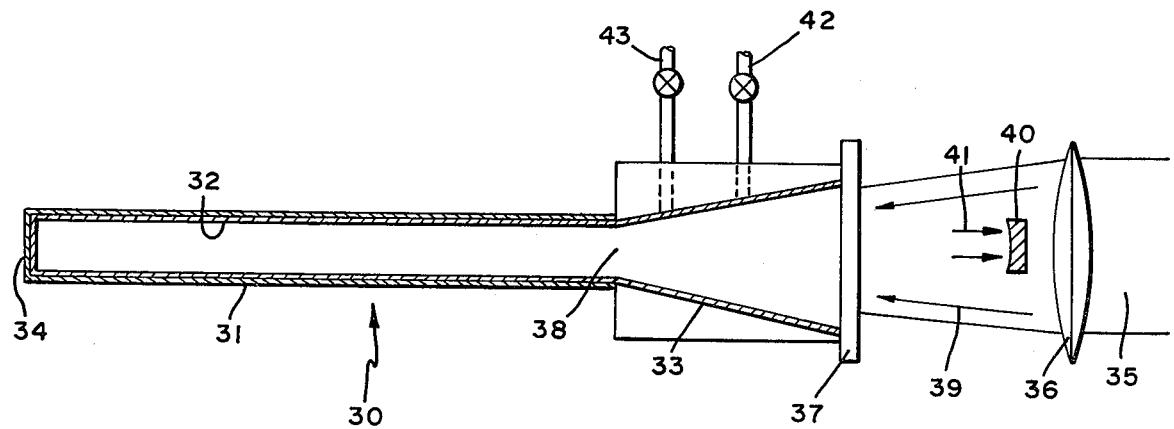
FIG. 4 is a cross sectional view showing an alternate embodiment of the invention shown in FIG. 3.

The apparatus of FIG. 3 includes a multipass cell, indicated generally at 10, for optimum utilization of photons in the infrared multiphoton-induced dissociation of methylamine. The cell includes two curved mirrors 12 and 13 mounted on flanges 14 and 15. These mirrors may be planar, spherical, ellipsoidal or any combination thereof, whichever is optimal for coupling the input radiation to the gaseous methylamine. The flanges are connected in turn to the main body 11 of the cell by vacuum tight, flexible metal bellows 16 and 17, respectively. Micrometers 18 and 19, mounted on the flanges and contacting the main cell body, enable precise orientation and spacing of the mirrors to be achieved, the orientation and spacing adjustments being allowed by the flexible bellows.

The cell also includes means 20 for introducing thereinto methylamine gas and other gaseous reactants, and means 21 for removing irradiated gas that includes a mixture of the original gases and gaseous products formed. The irradiated gas passes to means (not shown) for separating the various compounds, which may comprise, for example, a chromatographic separation column.

The optical system comprises one or more lenses 22, either spheric or aspheric. These lenses adjust the input radiation 23 in size and divergence to the desired characteristics. These characteristics are determined in combination with the selection of the curvature of mirrors 12 and 13 so as to induce maximum absorption of the radiation by the methylamine while maintaining a high power density pathlength product for the beam throughout most of the cell volume. The adjusted beam 24 is coupled into the cell through a transparent portion 25 of mirror 12. The rest of the mirror is coated for maximum reflecting at the wavelength of the laser being utilized. The entire surface of the second mirror 13 is coated in a similar fashion. By adjusting the angle and separation of the mirrors, the laser beam may be reflected several times, as shown generally at 26, over a significant portion of the cell volume while maintaining a high power density.

The apparatus shown in FIG. 4 includes a light trapping cell, indicated generally at 30, for use in the separation of isotopes, such as $^{14}N$ and $^{15}N$, via infrared multiphoton dissociation of methylamine. The apparatus includes a long tube 31 either provided with a reflective coating 32 (thickness exaggerated) on its inner surface or a highly polished inner surface for optimum relectivity at the laser wavelength employed. The tube has a flared opening 33 at one end which is also highly reflecting. The tube is sealed by surface 34 at its other end, which also has a highly reflecting inner surface. A laser beam 35 is focused by optical system 36 through a window 37 attached to the flared end of the tube. This optical system may be comprised of one or more lenses, or a raster of square focusing prisms whose foci are coincident with the input of the cylindrical tube at 38. The flaring 33 allows for more efficient coupling of converging radiation 39 into the cylindrical tube. Inside the tube, the laser beam is reflected from the walls, maintaining a high power density and efficient light trapping. A small reflecting mirror 40 may optionally be placed adjacent the focusing optics to reflect back non-absorbed radiation 41 emerging from the cylindrical tube.

Introduction of the methylamine and other reactant gases and removal of the irradiated gas are accomplished by ports 42 and 43, respectively, in the light trapping cell. The irradiated gas, comprising a mixture of the original gases and gaseous products formed, then passes to physical separation means (not shown), such as a chromatographic column.

The process and apparatus of the invention may also be advantageously employed in separating carbon isotopes such as $^{12}C$ and $^{13}C$. The stretching modes disclosed herein are due to couplings between carbon and nitrogen atoms. An isotopic change in the carbon atom will result in a similar, although not identical, shift in absorption wavelength, as is manifested by isotopic substitution of the nitrogen atom. Hence, the same stretching modes and approximately the same excitation wavelengths used to separate nitrogen isotopes can be used to separate carbon isotopes.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

The decomposition of methylamine by multiphoton absorption was observed during three test runs. In each of the runs a sample of methylamine gas was subjected to radiation from a $CO_2$ TEA laser tuned to the P(30) transition of the 9.6μm band (1037.43 cm$^{-1}$). The radiation frequency matched a point of significant absorption in the P-branch of the methylamine CN stretch vibration. The $CO_2$ laser was a Lumonics TA203 pulsed laser, which delivered a multimode, tuned output of 0.5 to 1.0 joule in a 200 ns pulse. Radiation from the $CO_2$ laser was focused with a 7.5 inch focal length lens into a sample cell containing the methylamine gas. The sample cell was a glass cylinder having a gas volume of 196 cc, and a pair of NaCl windows to pass the laser radiation. At the radiation focus, approximately in the cell center, the peak power was about $3 \times 10^8$ watts/cm$^2$.

During each run, the sample was irradiated with 5000 pulses and then collected into a small storage vessel for gas chromatograph analysis. The column in the gas chromatograph was packed with Chromosorb 103. Analyses showed that the major constituents of the sample were ammonia, methane, ethylene, and the residual methylamine. The amount of ammonia varied between 40 to 50 mole percent of the methylamine decomposed.

The results of the test runs are listed below in Table I.

Table I

| Test Run # | $CH_3NH_2$ Pressure (Torr) | Number of Laser Pulses | Energy Per Pulse (mJ) | $CH_3NH_2$ Decomposed (%) |
|---|---|---|---|---|
| 1 | 0.5 | 5,000 | 500 | 25 |
| 2 | 1.0 | 5,000 | 600 | 28 |
| 3 | 5.0 | 5,000 | 500 | 32 |

EXAMPLE 2

$CH_3{}^{15}NH_2$ gas was abstracted from a sample of $CH_3{}^{15}NH_2 \cdot HCl$ powder by mixing the sample with a concentrated solution of NaOH to neutralize the HCl and then treating with NaOH pellets to remove water therefrom. The $^{15}N$ containing sample was mixed with natural methylamine in approximately a 1:1 ratio and examined on an Extranuclear Quadrupole Mass Spectrometer to determine the ratio of $CH_3{}^{15}NH_2/CH_3{}^{14}NH_2$ therein. The ratio of $CH_3{}^{15}NH_2/CH_3{}^{14}NH_2$ contained therein was determined to be 0.81. Several samples of the mixture were irradiated during a series of test runs conducted, according to the procedure set forth above in Example 1. The laser was tuned to the R(14) transition of the 10.6 μm band (971.93 cm$^{-1}$). The exposed samples were then examined on a G.C. mass spectrometer to determine the $^{15}N/^{14}N$ ratio in the ammonia formed. The results of the test runs are shown below in Table II.

TABLE II

| Test Run # | $CH_3NH_2$ Pressure (Torr) | Number of Laser Pulses | Energy Per Pulse (mJ) | Enrichment Factor, $\beta$, for $^{15}N$ |
|---|---|---|---|---|
| 1 | 1.0 | 5000 | 600 | 1.67 |
| 2 | 1.0 | 5000 | 600 | 1.62 |
| 3 | 1.5 | 5000 | 750 | 1.23 |
| 4 | 5.5 | 5000 | 600 | 1.10 |
| 5 | 1.5 + 7.5 Torr Isobutylene | 5000 | 600 | 1.05 |

Having thus described the invention in rather full detail, it will be understood that these details need not be strictly adhered to but that various changes and modifications may suggest themselves to one skilled in the art, all falling within the scope of the invention as defined by the subjoined claims. What is claimed is:

1. A process for obtaining compounds which are enriched in a particular first elemental isotope which comprises exposing gaseous methylamine containing said first isotope and one or more other isotopes of the same element to infrared radiation of a predetermined wave length from a laser which selectively dissociates said methylamine containing said first isotope without substantially dissociating said methylamine containing other isotopes of said element.

2. A process as recited in claim 1, wherein said first elemental isotope is any of the isotopes of nitrogen.

3. A process as recited in claim 1, wherein said first elemental isotope is any of the isotopes of carbon.

4. A process as recited in claim 1, wherein said enriched compound is selected from the group consisting of ammonia, nitric or nitrous oxide, molecular nitrogen, hydrogen cyanide and hydrazine.

5. A process as recited in claim 1, wherein said infrared radiation is obtained from a $CO_2$ laser.

6. A process as recited in claim 1, wherein said gaseous methylamine is passed through a cell in which said gaseous methylamine is exposed to a multiple-reflected beam of infrared radiation.

* * * * *